Feb. 15, 1955  T. IAVELLI ET AL  2,701,948
TORQUE CONVERTER FLUID SUPPLY SYSTEM
Filed Aug. 8, 1952  4 Sheets-Sheet 1
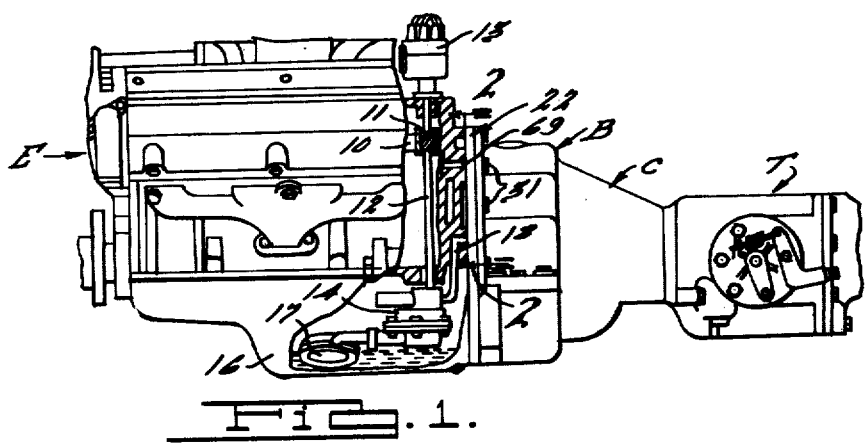
FIG. 1.
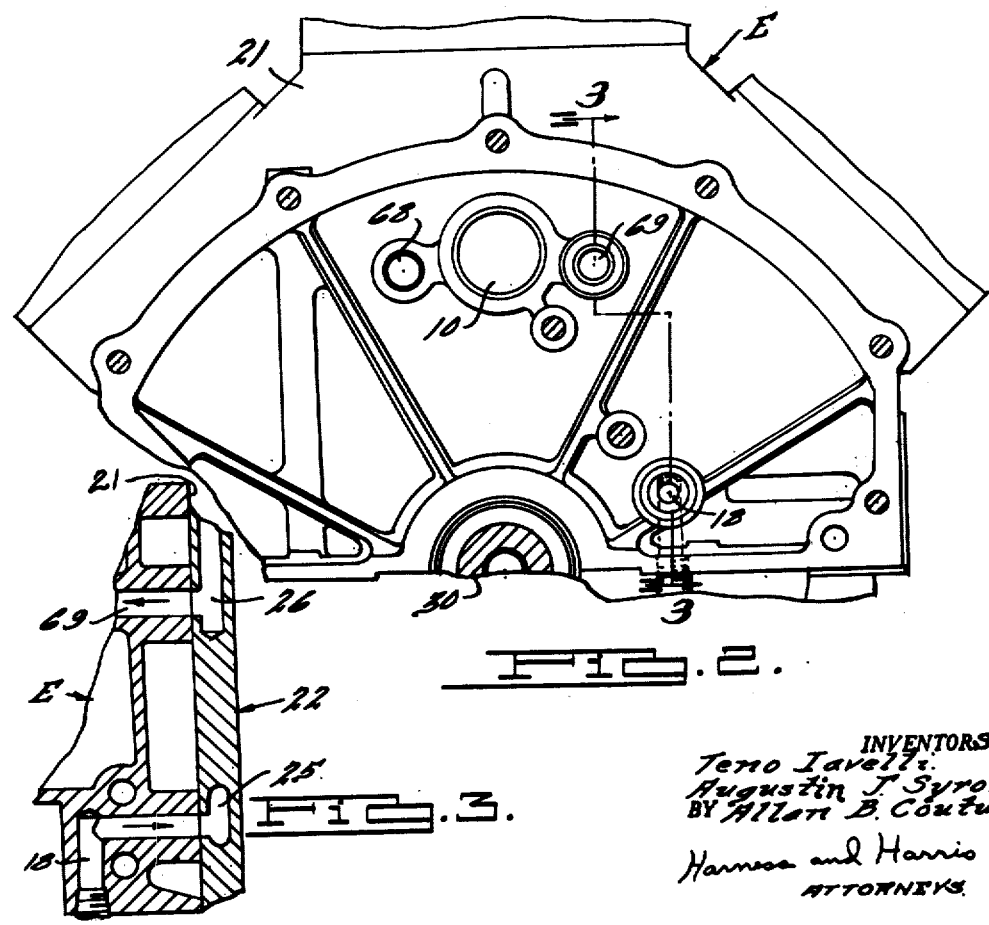
FIG. 2.
FIG. 3.
INVENTORS.
Teno Iavelli.
Augustin J. Syrovy.
BY Allan B. Couture.
Harness and Harris
ATTORNEYS.

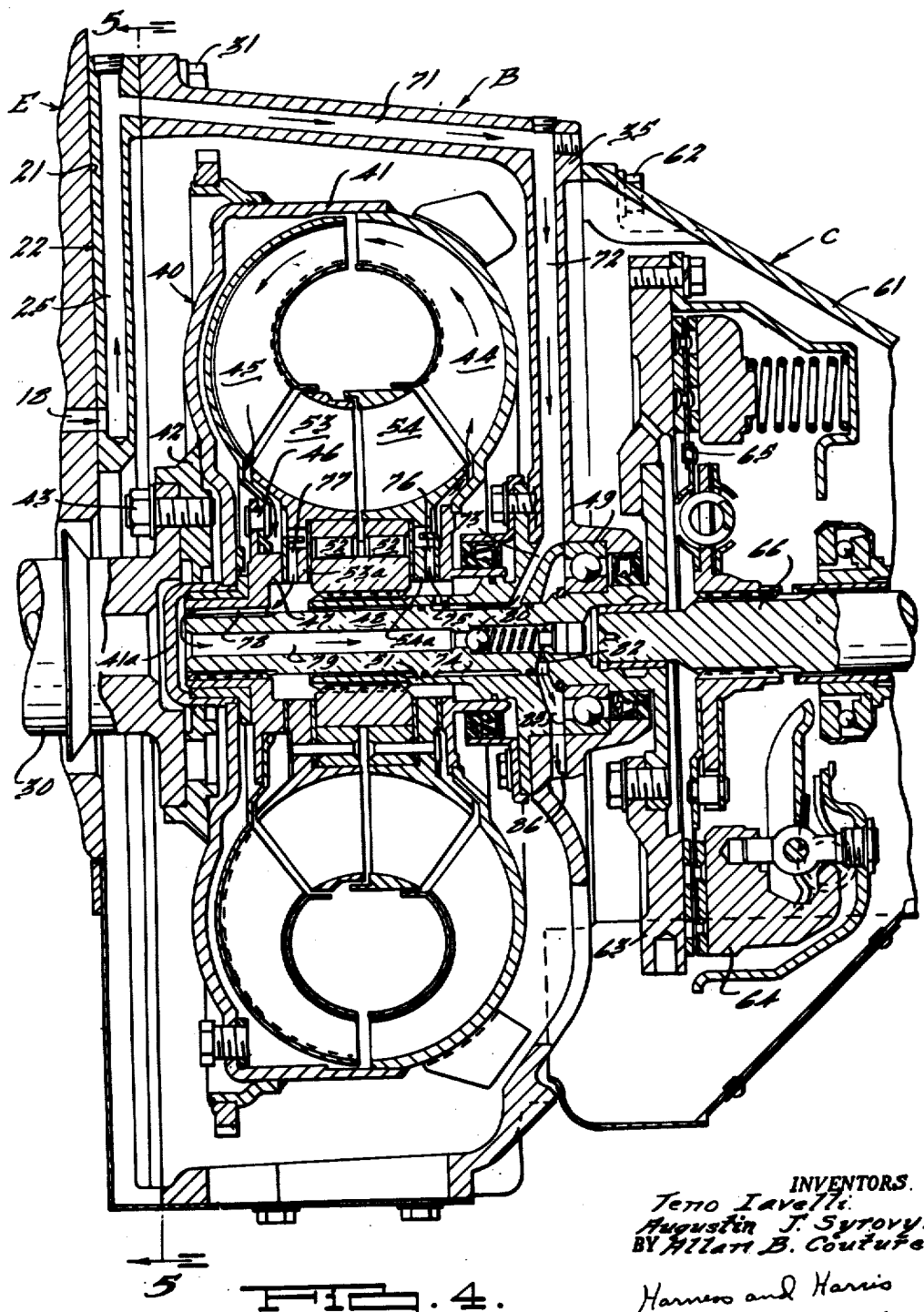

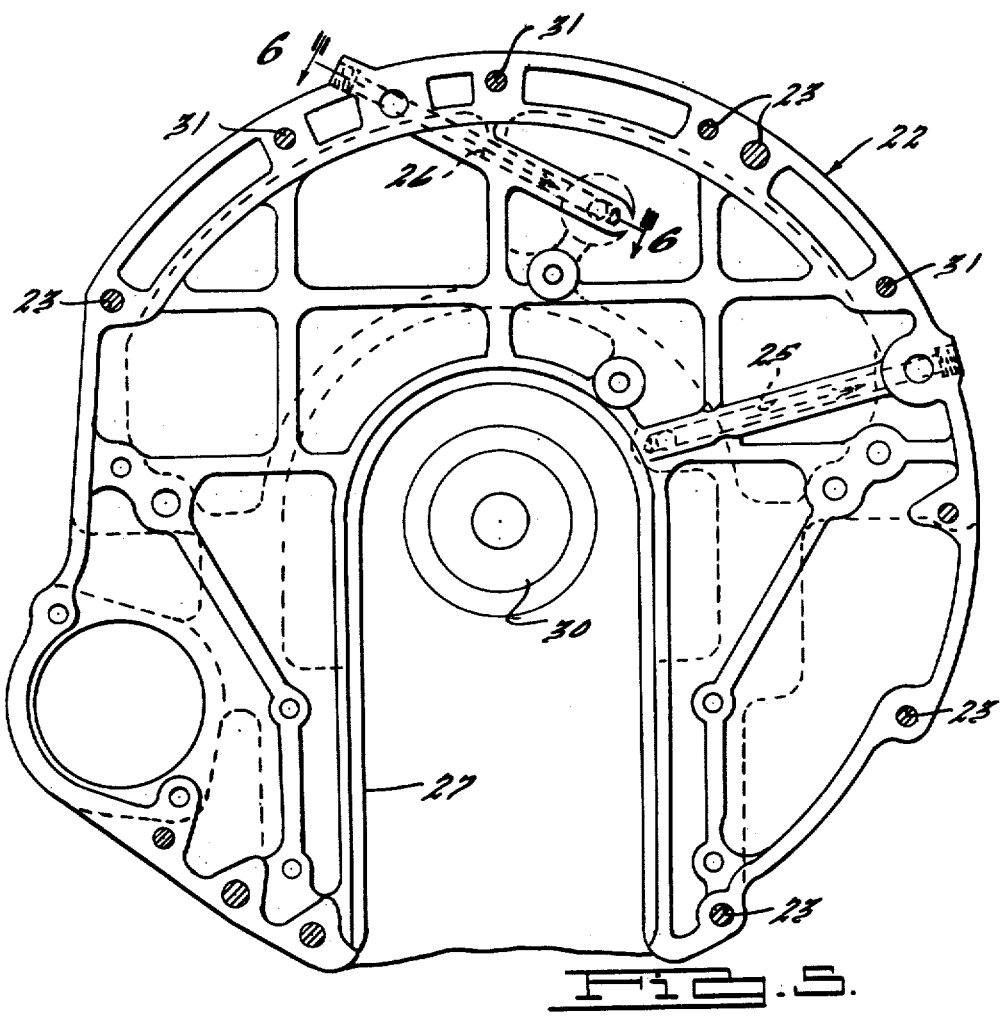
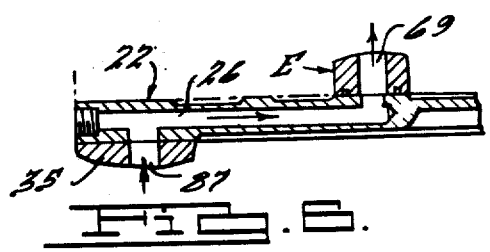

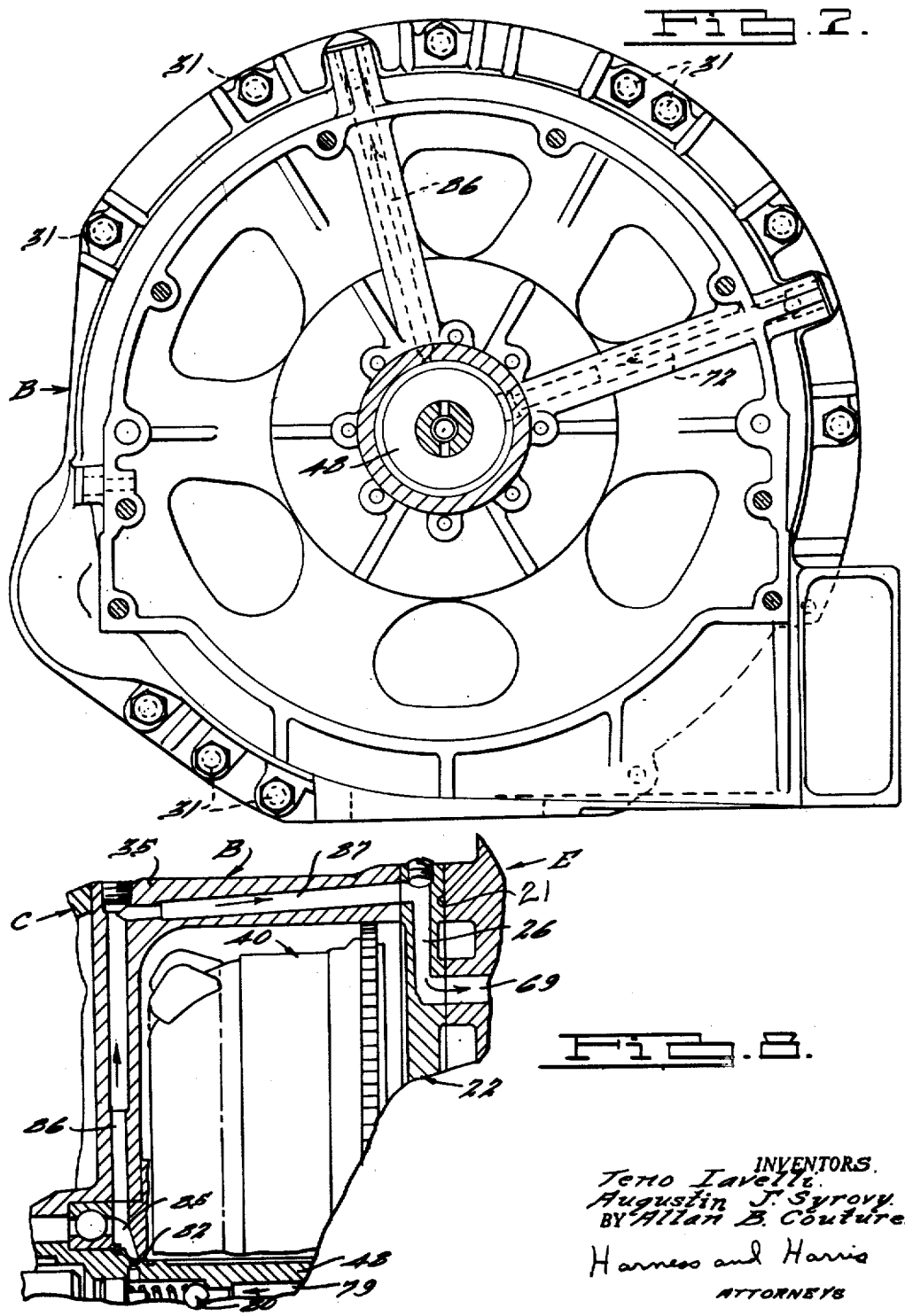

United States Patent Office 2,701,948
Patented Feb. 15, 1955

2,701,948

TORQUE CONVERTER FLUID SUPPLY SYSTEM

Teno Iavelli, Augustin J. Syrovy, and Allan B. Couture, Detroit, Mich., assignors to Chrysler Corporation, Highland Park, Mich., a corporation of Delaware Application August 8, 1952, Serial No. 303,442

6 Claims. (Cl. 60—12)

This invention relates to engine driven fluid operated power transmitting units and particularly to means for circulating the engine lube oil through the associated power transmitting unit as the working fluid of said power unit.

It is a primary object of this invention to provide an engine driven fluid operated power transmitting unit wherein pressurized engine lube oil is circulated through and forms the working fluid of the power transmitting unit.

It is another object of this invention to provide means for circulating the engine lube oil through the associated fluid operated power transmitting unit wherein the power transmitting unit has fluid flow control means to insure that the working fluid of the power transmitting unit will be pressurized.

It is still another object of this invention to provide novel means for connecting an engine lube oil system with the interior of an associated fluid operated power transmitting unit.

It is a further object of this invention to provide a novel means for eliminating certain elements from an engine driven fluid operated power transmitting system by arranging certain other elements such that they perform dual functions.

Other objects and advantages of this invention will become readily apparent from a reading of the following description of this invention and a consideration of the related drawings wherein:

Fig. 1 is a side elevational view, with parts broken away and shown in section, of a motor vehicle power plant and the associated power transmitting equipment;

Fig. 2 is an enlarged, fragmentary, sectional elevational view taken along the line 2—2 of Fig. 1 showing the rear end of the engine;

Fig. 3 is a fragmentary, sectional elevational view taken along the line 3—3 of Fig. 2;

Fig. 4 is an enlarged, sectional elevational view showing the interior of the fluid power transmitting unit;

Fig. 5 is a sectional elevational view taken along the line 5—5 of Fig. 4 showing the rear side of the adapter plate;

Fig. 6 is a fragmentary sectional elevational view taken along the line 6—6 of Fig. 5 showing portions of the adapter plate oil transfer passages;

Fig. 7 is a sectional elevational view looking at the rear side of the fluid power transmitting unit housing; and Fig. 8 is a sectional elevational view that shows in a single plane the conduit means for returning the engine lubricating oil from the fluid power transmitting unit to the engine.

Fig. 1 of the drawings shows an engine E that includes a rotatable camshaft 10 having gearing 11 that is adapted to drive a combination pump and distributor rotor shaft 12. The ignition distributor 13 is mounted on the upper end of shaft 12 while the engine lubricating oil circulating pump 14 is mounted on the lower end of shaft 12. Pump 14 is connected to the lube oil supply sump 16 through a strainer element 17. It is thought to be obvious that during operation of the engine E the camshaft 10 will drive pump shaft 12 and cause the pump unit 14 to withdraw lube oil from the sump 16 and discharge it under pressure to the lube oil supply duct 18.

Bolted to the rear end 21 of the engine E is an adapter plate 22. The adapter plate 22 is substantially a flat disc having a plurality of bolt receiving apertures 23 spaced circumferentially about its periphery (see Fig. 5). Plate 22 also includes a pair of drilled passages 25 and 26 that each extend inwardly through the plate from the plate outer peripheral edge towards the center thereof. The purpose of the drilled passages 25 and 26 will become readily apparent from the subsequent description of this invention. The adapter plate 22 has a U-shaped opening 27 cut out of its lower portion to provide a slot to receive the rear end of the crankshaft 30 of the engine E.

Mounted against the rear face of the adapter plate 22 and secured to the rear end 21 of the engine E by the bolts 31 is the fluid power transmitting unit B. Power transmitting unit B in this instance is a hydrodynamic torque converter although for purposes of this invention it might be a two element fluid coupling or any similar type of fluid operated power transmitting device. The power transmitting unit B comprises a housing 35 of dished cross sectional configuration that has rotatably mounted therein the torque converter unit 40. The torque converter unit 40 comprises a casing 41 having hub portions 42 that are drivingly connected by bolts 43 to the rear end of the engine crankshaft 30 (see Fig. 4). Casing 41 has fixed thereto the vaned impeller member 44 of the torque converter unit. Arranged adjacent the impeller member 44 is the vaned turbine member 45. Turbine member 45 is connected by rivets 46 to a flange on a hub member 47 that is drivingly connected to the driven shaft 48. Driven shaft 48 has its front end portion piloted in the converter casing portion 41a that is countersunk in the rear end of the engine crankshaft 30. An intermediate portion of driven shaft 48 is journaled in the ball bearing assembly 49 that is seated in the housing 35. Housing 35 also mounts an axially extending sleeve 51 that supports at its free end the one-way brake devices 52. Rotatably mounted on the one-way brake devices 52 are a pair of vaned guide or reaction wheels 53 and 54 respectively. The function of the guide wheels 53, 54 in the closed toroidal fluid flow circuit of the torque converter unit 40 is thought to be obvious and to not require further explanation.

Mounted at the rear of the fluid power transmitting unit B is a friction clutch device C. Clutch device C comprises a housing 61 that is connected to the housing 35 of the fluid power transmitting unit B by the bolts 62. Mounted within the clutch housing 61 are the driving and driven elements of the clutch C. The driving element of clutch C includes the backing plate 63, that is drivingly connected to the driven shaft 48, and the associated pressure plate 64 that is carried by the backing plate 63. The driven element of the clutch C comprises the clutch disc 65 that is carried by the output shaft 66 and arranged to be clampingly engaged between the aforementioned backing and pressure plates 63 and 64 respectively. Clutch C is of conventional construction and further description is not considered necessary particularly in view of the fact that this invention is not directly concerned with the clutch C or its manner of operation. Clutch C may have its output shaft 66 connected to a change speed transmission unit T (see Fig. 1) or it may be directly connected to a propeller or drive shaft or the like.

Referring to Figs. 1 and 2, it will be noted that the rear end of the engine camshaft 10 is journaled in the rear end of the engine block. Also, arranged beside the camshaft 10 and extending substantially parallel thereto are a pair of lube oil circulating galleries 68 and 69 respectively. The gallery 68 in this instance is the lube oil supply gallery and is connected to the supply conduit 18 while the gallery 69 is arranged to return lube oil to the engine lube oil supply sump 16. The use of the pump discharge conduit 18 and the lube oil supply and return galleries 68, 69 in the circulation of oil through the torque converter unit 40 will become readily apparent from the following description.

The adapter plate 22 is so designed that when it is mounted on the rear side 21 of the engine block E, the oil transfer passage 25 of plate 22 is connected to the engine lube oil pump discharge conduit 18 and the oil transfer passage 26 in plate 22 is connected to the engine lube oil return gallery 69 (see Figs. 3, 4, and 8).

From a consideration of Fig. 4 particularly, it will be noted that the housing 35 for the fluid power transmitting unit B is pierced by a pair of connected bores or passages 71, 72 that are arranged to be connectible with the lube oil supply passage 25 in the adapter plate 22. Passage 72 in housing 35 is connected to a bore 73 that transmits the lube oil from passage 72 through a necked down portion 74 of the driven shaft 48 to a port 75 in the fixed housing sleeve 51. Fluid passing through port 75 is directed through a passage 76 in the torque converter guide wheel hub portion 54a into the fluid circuit within the converter casing 41. The fluid entering the converter interior through passage 76 is circulated around the interior from the impeller 44 to the turbine 45 and back to the guide wheels 53, 54 as indicated by the arrows. As additional fluid is pumped into the converter interior fluid leaves the converter circuit through the passage 77 in the hub portion 53a of the guide wheel 53. Fluid leaving the converter interior through passage 77 is directed through a slot formed by an omitted tooth in the splined connection 78 at the front end of shaft 48 and is passed into a bore 79 that extends axially along the driven shaft 48. Shaft bore 79 is necked down to provide a valve seat to receive the ball valve 80. Ball valve 80 is a spring pressed, one-way valve that is set to maintain approximately 20 p. s. i. pressurized fluid in the converter and engine lube oil system. Valve 80 thus maintains a certain pressure in the engine lube oil system during all engine operation even though the engine lub oil is pumped through the converter. This ball valve 80 also prevents drainage of the fluid from the converter when the engine is not running and thus the converter always has sufficient fluid therein, on initial engine start, to transmit drive. The driven shaft bore 79 on the downstream or discharge side of the valve 80 is connected to a restriction passage 82. Restriction passage 82 restricts the discharge flow from the converter and as this restriction is on the discharge side of the converter it applies the full pressure of pump 14 to the fluid circulated within the converter. It has been found that pressurizing the converter with the full pressure of the engine lube oil circulating pump has very definite advantages in that the torque multiplication ratio may be raised and the stall speed lowered over a similar arrangement wherein the restriction passage is located on the intake side of the converter unit. However, it is to be considered within the scope of this invention to place the restriction 82 at any point in the fluid circulating system regardless of whether the converter unit works under pressurized fluid or not.

The restriction passage 82 in driven shaft 48 (see Figs. 4 and 8) connects with a discharge bore 85 that is formed in the housing 35 of the fluid power transmitting unit B. Discharge bore 85 is connected to certain other housing contained conduit passages 86 and 87 that return the converter circulated fluid to the adapter plate 22. Return passages 86, 87 of the housing 35 are arranged such that the passage 87 connects with the passage 26 in the adapter plate 22. As previously mentioned the adapter plate passage 26 is connected to the lube oil return gallery 69.

From the above description of the several fluid flow conduit means it is thought to be apparent that the engine driven lube oil circulating pump 14 withdraws lube oil from the sump 16 and discharges it under pressure through the conduits 18, 25, 71, 72, 73, 74, 75, 76 into the converter toroidal circuit. The fluid in the toroidal circuit of the converter is maintained under the pressure of the pump 14 as a result of the one-way valve 80 and the restriction orifice 82 both of which are located on the discharge side of the converter unit. Fluid that is passed through the converter toroidal circuit discharges therefrom by way of conduits 77, 78, 79, 80, 82, 85, 86, 87, 26 back to the engine oil gallery 69 that returns the lube oil to the engine lube oil supply sump 16. Discharge from the return gallery 69 to the sump 16 is preferably below the level of the fluid in the sump to prevent frothing and loss of the fluid by vaporization of the hot oil during extreme operating conditions such as during towing, pushing or mountain climbing. Briefly stated the converter fluid circuit is from the engine driven pump 14 to the converter unit 40 and through the converter unit 40 back to the engine lube oil supply sump 16.

With the arrangement described it is possible to eliminate the usual torque converter fluid circulating pump and utilize the existing engine lube oil circulating pump for both lube oil circulation and torque converter fluid circulation. Furthermore, the few structural changes required to utilize the engine lube oil circulating pump for this dual function are simple and economical and for that reason this invention is particularly attractive to the motor vehicle industry.

We claim:

1. In combination, an engine and a fluid operated power transmitting unit drivingly connected thereto, said engine including a lube oil sump, an engine driven engine lubricating oil circulating pump connected to said sump and first conduit means connecting said pump to various portions of said engine to provide for the application of pressurized lube oil to said portions of said engine, said power transmitting unit comprising a housing directly mounted on said engine having a pair of fluid transmitting passages extending therethrough, one of said fluid transmitting passages being connected to said pump through said engine and the other of said passages being connected to said sump through said engine, a casing within said housing containing relatively rotatable, vaned, driving and driven elements, a second conduit means connecting said one fluid transmitting passage in the housing to the interior of said casing and a third conduit means connecting the interior of said casing to said other fluid transmitting passage in the housing, and valve means in said third conduit means to insure a predetermined lubricating oil pressure and to maintain a predetermined pressure in said power transmitting unit casing.

2. In combination, an engine and a fluid operated power transmitting unit drivingly connected thereto, said engine including a lube oil sump, an engine driven engine lubricating oil circulating pump connected to said sump and first conduit means connecting said pump to various portions of said engine to provide for the application of pressurized lube oil to said portions of said engine, said power transmitting unit comprising a housing directly mounted on said engine having a pair of fluid transmitting passages extending therethrough, one of said fluid transmitting passages being connected to said pump through said engine and the other of said passages being connected to said pump through said engine and the other of said passages being connected to said sump through said engine, a casing within said housing containing relatively rotatable, vaned, driving and driven elements, a second conduit means connecting said one fluid transmitting passage in the housing to the interior of said casing and a third conduit means connecting the interior of said casing to said other fluid transmitting passage in the housing, valve means in one of said conduit means to insure a predetermined pressure in engine lubricating oil system, and restriction means in said third conduit means arranged to apply the pump discharge pressure to the interior of said casing.

3. In combination, an engine and a fluid operated power transmitting unit drivingly connected thereto, said engine including a rotatable crankshaft, a lube oil sump, and an engine driven engine lube oil pump connected by conduit means to said sump and to various portions of said engine, an adapter plate mounted directly on the rear end of said engine having a pair of oil transfer passages therein, one of said passages being connected to said pump and the other of said passages being connected to said sump, said fluid operated power transmitting unit being mounted on said adapter plate and comprising a housing having a pair of oil transfer bores extending therethrough, each of said bores being connected to one of the oil transfer passages in said adapter plate, a closed casing rotatably mounted in said housing and drivingly connected to said crankshaft, said casing containing a pair of relatively rotatable driving and driven vaned wheels, and an axially extending driven shaft piercing said casing and drivingly connected to said driven wheel, a first fluid conduit bore extending axially of said shaft connecting the interior of said casing to the oil transfer bore in said housing that is connected to the sump, and a second fluid conduit bore connecting the other oil transfer bore in said housing to the interior of said casing.

4. In combination, an engine and a fluid operated power transmitting unit drivingly connected thereto, said engine including a rotatable crankshaft, a lube oil sump, and an engine driven engine lube oil pump connected by conduit means to said sump and to various portions of said engine, an adapter plate mounted directly on the rear end of said engine having a pair of oil transfer passages therein, one of said passages being connected to said pump and the other of said passages being connected to said sump, said fluid operated power transmitting unit being mounted on said adapter plate and comprising a housing having a pair of oil transfer bores extending therethrough, each of said bores being connected to one of the oil transfer passages in said adapter plate, a closed casing rotatably mounted in said housing and drivingly connected to said crankshaft, said casing containing a pair of relatively rotatable driving and driven vaned wheels, and an axially extending driven shaft piercing said casing and drivingly connected to said driven wheel, a first fluid conduit bore extending axially of said shaft connecting the interior of said casing to the oil transfer bore in said housing that is connected to the sump, and a second fluid conduit bore connecting the other oil transfer bore in said housing to the interior of said casing, one of said last mentioned fluid conduit bores including a one-way valve arranged to maintain a pressure head in the engine lube oil system and in the oil in said casing.

5. In combination, an engine and a fluid operated power transmitting unit drivingly connected thereto, said engine including a rotatable crankshaft, a lube oil sump, and an engine driven engine lube oil pump connected by conduit means to said sump and to various portions of said engine, an adapter plate mounted directly on the rear end of said engine having a pair of oil transfer passages therein, one of said passages being connected to said pump and the other of said passages being connected to said sump, said fluid operated power transmitting unit being mounted on said adapter plate and comprising a housing having a pair of oil transfer bores extending therethrough, each of said bores being connected to one of the oil transfer passages in said adapter plate, a closed casing rotatably mounted in said housing and drivingly connected to said crankshaft, said casing containing a pair of relatively rotatable driving and driven vaned wheels, and an axially extending driven shaft piercing said casing and drivingly connected to said driven wheel, a first fluid conduit bore extending axially of said shaft connecting the interior of said casing to the oil transfer bore in said housing that is connected to the sump, and a second fluid conduit bore connecting the other oil transfer bore in said housing to the interior of said casing, said first fluid conduit bore in said shaft having a restriction orifice therein to maintain a pressurized engine lube oil system and a pressurized casing during engine operation.

6. In combination, an engine and a fluid operated power transmitting unit drivingly connected thereto, said engine including a rotatable crankshaft, a lube oil sump, and an engine driven engine lube oil pump connected by conduit means to said sump and to various portions of said engine, an adapter plate mounted directly on the rear end of said engine having a pair of oil transfer passages therein, one of said passages being connected to said pump and the other of said passages being connected to said sump, said fluid operated power transmitting unit being mounted on said adapter plate and comprising a housing having a pair of oil transfer bores extending therethrough, each of said bores being connected to one of the oil transfer passages in said adapter plate, a closed casing rotatably mounted in said housing and drivingly connected to said crankshaft, said casing containing a pair of relatively rotatable driving and driven vaned wheels, and an axially extending driven shaft piercing said casing and drivingly connected to said driven wheel, a first fluid conduit bore extending axially of said shaft connecting the interior of said casing to the oil transfer bore in said housing that is connected to the sump, and a second fluid conduit bore connecting the other oil transfer bore in said housing to the interior of said casing, one of said last mentioned fluid conduit bores including a one-way valve to insure a pressurized lube oil system and said first fluid conduit bore in said shaft having a restriction orifice therein insure pressurized fluid in said casing during engine operation.

References Cited in the file of this patent

UNITED STATES PATENTS

| 1,766,520 | Klimek | June 24, 1930 |
| 2,186,748 | Berger | Jan. 9, 1940 |
| 2,402,369 | Carlson | June 18, 1946 |
| 2,565,203 | Churchill | Aug. 21, 1951 |
| 2,630,682 | Wemp | Mar. 10, 1953 |

FOREIGN PATENTS

| 518,082 | Great Britain | Feb. 16, 1940 |

UNITED STATES PATENT OFFICE

CERTIFICATE OF CORRECTION

Patent No. 2,701,948                                February 15, 1955

Teno Iavelli et al

It is hereby certified that error appears in the printed specification of the above numbered patent requiring correction and that the said Letters Patent should read as corrected below.

Column 3, line 29, for "lub oil" read --lube oil--; column 4, lines 43 to 45, strike out "and the other of said passages being connected to said pump through said engine"; line 54, after "in" insert --the--.

Signed and sealed this 22nd day of March, 1955.

(SEAL)

Attest:

E. J. MURRY
Attesting Officer

ROBERT C. WATSON
Commissioner of Patents